Feb. 18, 1947.     B. M. HADFIELD     2,416,096
SELECTIVE ELECTRICAL CIRCUIT
Filed Sept. 5, 1942     2 Sheets-Sheet 1

INVENTOR.
BERTRAM MORTON HADFIELD
BY
ATTORNEY

Feb. 18, 1947. B. M. HADFIELD 2,416,096
SELECTIVE ELECTRICAL CIRCUIT
Filed Sept. 5, 1942 2 Sheets-Sheet 2

INVENTOR.
BERTRAM MORTON HADFIELD
BY
ATTORNEY

Patented Feb. 18, 1947

2,416,096

UNITED STATES PATENT OFFICE 2,416,096

SELECTIVE ELECTRICAL CIRCUIT

Bertram Morton Hadfield, Harrow Weald, England, assignor to Automatic Electric Laboratories Inc., a corporation of Delaware Application September 5, 1942, Serial No. 457,467
In Great Britain November 18, 1941

21 Claims. (Cl. 177—352)

1

The present invention relates to selective electrical circuits and its object is to improve the static and dynamic responses of electrical circuits where two or more outputs are required from a similar number of inputs and over the operative range of any output there exists an undesired response. For instance in the field of selective signalling by alternating currents of different frequencies, it is desirable to improve the static and dynamic response of the output circuit corresponding to particular frequencies by eliminating the response of any output circuit to frequencies other than the particular frequency assigned to it. The invention also has application to devices for responding to different colours in a common light source so that when one colour predominates, other devices are rendered ineffective, for determining when a movable object such as an aeroplane has come within a certain range of one detector and beyond a predetermined range of a number of other detectors when such detectors are rendered ineffective, for testing various objects on a comparative basis so that for instance when one object falls below a certain standard it produces no effect on the output circuit and in fact to any purpose where voltages or currents may be derived from two or more quantities which vary with respect to each other or which voltages or currents have a consistent relationship to such variable quantities.

According to a broad feature of the invention the undesired static outputs of selective electrical circuits are reduced to zero or ineffectual magnitudes by means of a suitable impedance connected between a common junction of the inputs and a common junction of the outputs; preferably the desired dynamic outputs are improved by forming the impedance of a suitable condenser connected in parallel with a resistance.

According to one feature of the invention a selective electrical circuit is provided in which the feeding of currents or voltages from a number of input circuits to corresponding output circuits is so arranged by means of common junction points to the input and the output circuits and by a predetermined relation between the impedances of the output circuits and the impedance between the junction points that the currents or voltages in one or more input circuits are rendered substantially ineffective in their corresponding output circuit or circuits when the currents or voltages fed from one input circuit to its corresponding output circuit predominates to a predetermined extent.

It will be appreciated that if the currents or voltages applied to the input circuit are A. C. the reduction of the current in the output circuits can only be obtained if the frequencies and phases are made to balance and while this may be possible in certain simple cases it is not readily practicable in the majority of cases in which the invention will be applied. On the other hand if currents or voltages applied to the input circuits are D. C. whether derived from an alternating source or not or if the current or voltages applied to the input circuits are A. C. and are rectified in transit through the selective electrical circuit then the difficulties which frequency and phase give rise to are avoided and according therefore to a preferred form of the invention a selective electrical circuit is provided in which the feeding of currents or voltages from a number of input circuits to corresponding output circuits is arranged by means of common junction points to the input circuits and output circuits respectively and by a predetermined relationship between the resistances of the respective output circuits and the resistance between the junction points and if necessary by means of rectifiers to convert the currents or voltages in the output circuits into D. C. so that the D. C. currents or voltages in one or more of the output circuits are reduced to zero or rendered substantially ineffective when the currents or voltages fed from one input circuit predominate to a predetermined extent.

The invention has application to inputs derived from a common source but passing through different channels as for instance an A. C. source of currents of two or more frequencies sent as a signal over a transmission line and then routed over circuits having different frequency characteristics to the respective inputs, from a common source of light via photoelectric cells having different colour responses, from a common source of energy (electric heat, light, etc.) transmitted through different mediums so that the effects of the different mediums may be compared, from a common detectable moving object via a number of separately located detectors so that it can be determined when the object is within a predetermined range of any particular detector.

The invention has also application to inputs derived from different sources and passing through the same transmitting medium and via individual selective circuits to the respective inputs as for instance signalling and speech currents transmitted over the same cable and passing to the inputs via selective circuits, one responsive to and one rejecting the signalling frequency.

Again the invention has application to inputs derived from different sources but subject to a common controlling factor; for instance where different transmission mediums require to be compared, the common source may be replaced by separate sources provided such sources are controlled so as to be equivalent to each other or to have a predetermined relationship to each other.

The invention will be described with reference to the accompanying drawings in which—

Figures 1, 2:
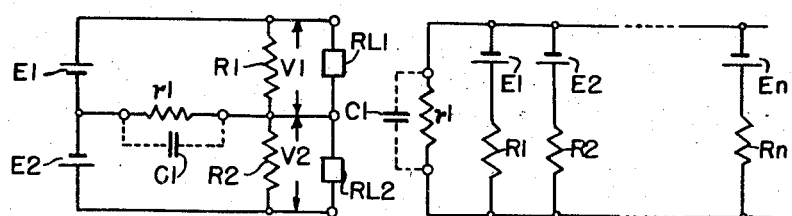
Fig. 1 illustrates the general principles of the invention applied to two inputs only to which direct current is applied.
Fig. 2 illustrates the extension of the arrangement shown in Fig. 1 to any number of inputs.

As an illustration of the invention a simple circuit (Fig. 1) will be considered in which the inputs consist of two sources of direct current of voltages $E1$ and $E2$ having zero resistance, with similar poles connected together and forming the common junction point before referred to. It will be supposed that the voltages vary in such a manner with variation of the common variable (for instance, frequency) that each successively passes through a maximum but that each has a significant value at around the maximum value of the other. For instance the voltages may have been derived from two resonant circuits of different resonant frequencies and it is desired to obtain outputs over a band of frequencies about each maximum free from the significant response to the other frequency. The outputs are developed across two resistances $R1$ and $R2$ to which are connected respectively the responding devices $RL1$ and $RL2$. Each of the latter devices is of such character as to operate whenever the output voltage developed across its associated resistance $R1$ or $R2$ exceeds a predetermined value.

Assuming by way of example that the resistance of $R1$ is made equal to $R2$, it will be seen that whenever the input voltage $E1$ is equal to $E2$, the output voltage $V1$ likewise will be equal to $V2$. If under these circumstances $E1$ now is increased while $E2$ remains constant, the current flow through $R1$ and $r1$ will rise; the increased current flow through $R1$ will, of course, increase the output voltage $V1$, while the increased current flow through $r1$ will be effective to reduce the output voltage $V2$, it being apparent that when the increasing voltage drop in $r1$ reaches such a value that it is exactly equal and opposite to $E2$ the output voltage $V2$ will be reduced to zero. Under this condition, no current will flow through $R2$ either from $E2$ or from $E1$; but if $E1$ should continue to increase, current of increasing value would begin to flow through $R2$ in the reverse direction, producing an output voltage of reversed polarity.

By the application of Kirchhoff's laws it can be shown that the condition under which the output voltage $V2$ is zero will exist whenever the ratio $E1:E2$ is equal to the ratio $(R1+r1):r1$. Similarly, it may be shown that the output voltage $V1$ will be zero whenever the ratio $E2:E1$ becomes equal to the ratio $(R2+r1):r1$. Bearing in mind that the two input voltages are assumed to be controlled by a common variable such that they reach their respective maximum values at different times (each, however, having a significant value when the other is at its maximum) it will be seen that the resistance of $R1$, $R2$ and $r1$ can be fixed in accordance with the above ratios so that when $E1$ is at its maximum value the voltage drop in $r1$ will exactly balance $E2$, and so that when $E2$ is at its maximum value the voltage drop in $r1$ will exactly balance $E1$. In other words, the resistances may be so chosen that, despite the existence of a significant voltage on one input when the other is at its maximum value, the only output which will be energized under these circumstances will be that associated with the input whose voltage is at a maximum.

In any case where one of the input voltages predominates over the other to such an extent that the ratio of the former to the latter exceeds the ratio at which one of the outputs is reduced to zero, there will be a tendency for a voltage of reversed polarity to be built up in the latter output, as previously noted. If the reversed output produces an undesirable tendency to operate the associated responding device ($RL1$ or $RL2$) it may be eliminated by providing a rectifier connected across or in series with each of the output resistances $R1$ or $R2$.

The connection of additional rectifiers for elimination of the reversed outputs for ratios greater than the given value is as follows: for connection across $R1$ or $R2$ the negative ends are connected to the junction whilst for the series connection they are connected so as to tend to pass current from the respective inputs. Fig. 2 gives the circuit for any number of inputs from 2 to $n$ and is merely a rearranged version of Fig. 1.

Figure 11:
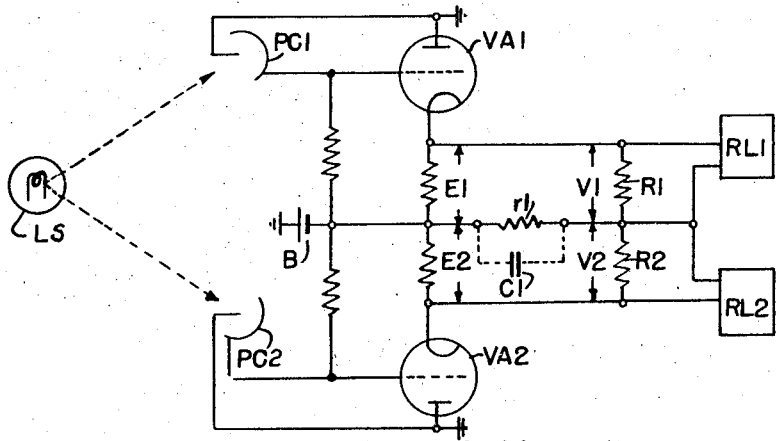
Fig. 11 shows the application of the invention to detection of a predominating colour in a given source of light.

The above applies to inputs which can be considered as D. C. A typical instance of such selective D. C. inputs is provided by the response characteristics of photoelectric cells to light of varying colour. It may be desired to obtain selective responses to certain components of an input light comprised of a variety of colours. Use would be made of cells having predominating responses to certain colours to provide the inputs $E1$, $E2$, etc., but confusion would result from the partial responses to other colours. By using the invention these partial responses can be eliminated over any desired band of colours about the desired one, assuming a knowledge of the colour response curves of the cells. Such an application is illustrated in Fig. 11 where LS represents the light source, PC1 and PC2 represent photoelectric cells having different response characteristics to light of varying colour, both of which are acted upon by the common light source LS; VA1 and VA2 are valves operating as cathode followers; B is the battery for the photocells and the anodes of the valves and E1 and E2 represent the voltages derived from the respective cells in response to the colour characteristics of the light source at any instant. RL1 and RL2 represent the receiving equipments which include valves or their equivalent of sufficient high resistance as not to affect the values of R1 and R2 or alternatively the resultant resistances of the combination of the resistances of RL1 with its shunt resistance and of the combination of the resistances of RL2 with its shunt resistance should be equal to the resistances R1 and R2 having regard to the desired relation between the resistances R1 and R2 and $r1$ as set out above.

Let it first be assumed that the light source LS is predominantly of a colour to which the photoelectric cell PC1 is very much more responsive than cell PC2. Since the grid bias of the valves VA1 and VA2 varies in accordance with the response of their respective photo-electric cells, the current flow in the cathode-anode circuit of VA1 will be much greater than that in the corresponding circuit of VA2. In other words, E1 will predominate over E2 to such an extent that, as explained in connection with Fig. 1, there will be an output voltage V1 of sufficient magnitude to operate RL1, while V2 will be reduced to zero, or at least to a value which is insufficient to operate RL2. If, on the other hand, the light source LS were predominantly of a colour to which cell PC2 is very much more responsive than cell PC1, the result would be just the reverse, RL2 operating instead of RL1. If the source were some intermediate colour, or a mixture of the colours to which the two cells are responsive, the output voltages V1 and V2 both would be of an appreciable value and hence would produce a tendency to operate both responding devices.

The above description shows how the desired static responses of the outputs may be improved by the invention, and a further advantage follows from the reduction of the undesired response over the desired range to zero. Although the outputs over the desired ranges are reduced in magnitude compared with the inputs the latter may now be increased to any degree without affecting the range over which the undesired outputs are zero, since the extremities of the latter depend only on the ratios of the inputs for a given output resistance network. Hence the operating factor of safety of succeeding apparatus may be made adequate over the desired range of operation without fear of false operation, and furthermore proportional changes in the absolute values of the selected input voltages E1 and E2, due for instance to changes in the input level supplying these voltages, will again not give any tendency to false operation over the given range.

The dynamic responses of the outputs may also be improved by a small addition to the circuit. The selection of the voltages E1 and E2 so as to have a more pronounced value over certain ranges of the input variable (for instance, frequency), generally means that on application and removal of the input the static responses of the outputs are not attained as quickly as the change of value of the input. The initial parts of the change in E1 and E2 are generally however rapid and similar in type and if the subsequent slower changes could be eliminated then a considerable improvement in the dynamic response of the outputs would be obtained. If the static response is made adequate then the subsequent slower change of response on application of the variable is immaterial, but the effect of the slower change on removal is enhanced. It is desirable to reduce this effect. This can be done to a greater or less degree depending upon the design of the resistance network, by prolonging the voltage developed on $r1$ upon removal of the variable. A condenser C1 shunted across $r1$ is one method applicable to the present circuit, and it can be seen that provided the time constant thus obtained is sufficient substantially to sustain the voltage on $r1$ until the voltages E1 and E2 have completed the initial rapid part of their change, then the remainder and slower part will be eliminated. Such an arrangement does, of course, impart a build up to the voltage on $r1$ on application of the variable, but this is of negligible importance and is generally much faster than the decay owing to the surge voltage normally obtained from the undesired input voltage which aids the wanted voltage to change the condenser.

The invention may be applied to any number of input voltages E1 and E$n$, as shown in Fig. 2, by ensuring that the latter all have one pole connected to a common busbar and that all the output resistances R1 to R$n$ also have one end connected to another common busbar; the remaining free poles and resistance ends being respectively joined. The common resistance $r1$ giving the required zero output of the undesired responses over the desired ranges is connected between the two busbars; its value and those of the output resistances being determined in the manner indicated before.

The invention may also be applied to cases where the input voltages are of rectified alternating type, that is where the desired output is direct current whether smoothed or pulsating and the input variable is alternating voltage. This class of circuit is of great importance in selective signalling by alternating currents. The application to three main types of such circuit will be described, these being (a) the type in which the unidirectional output is immediately smoothed by a storage condenser, (b) the type in which the unidirectional output is pulsating in character and is later smoothed by a filter, and (c) the type in which the unidirectional output is directly applied to an inductive load, smoothing of the current being obtained by virtue of the inductance.

The application to type (a) is similar to that already described, for the voltages on the storage condensers are presumably sufficiently smoothed so that instantaneous deviations from the mean direct current value are negligible. The only circuit requirement is that the storage condensers shall all have one lead of similar polarity joined together.

Figures 3, 4:
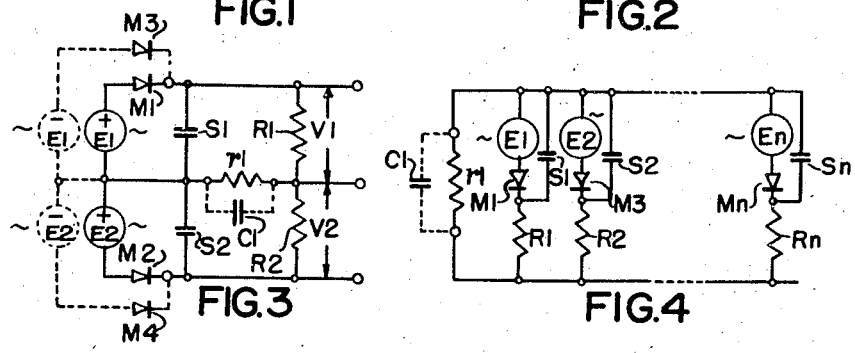
Figs. 3 and 4 illustrate applications of the invention in which alternating current is first rectified and smoothed so as to be equivalent to D. C. inputs before application to the input circuit.

The type (a) rectifier circuits are shown in Figs. 3 and 4 for two or $n$ inputs respectively. Since the storage condensers S1 and S2 in Fig. 3 and S1 to S$n$ in Fig. 4 have substantially constant voltages (this being their purpose) the resistance network is identical with the D. C. inputs case.

The method of rectification per input is shown as two alternatives: half-wave using generators E1 and E2 with respective rectifiers M1 and M2, or centre tapped full-wave with the addition of similar generators of reversed sign and rectifiers M3 and M4 (i e., with the dotted line components).

Figures 5, 6:
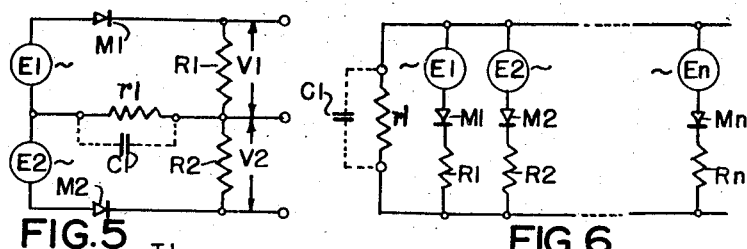
Figs. 5 and 6 illustrate applications of the invention in which the rectifiers for the alternating current inputs are located in the leads individual to the respective inputs and the inputs are not smoothed.
Figure 12:
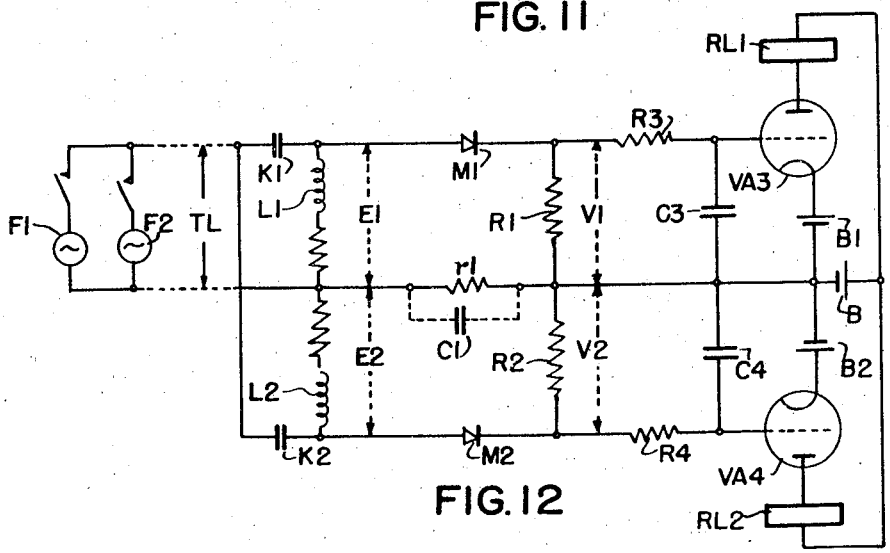
Fig. 12 shows the application of the invention to an A. C. signalling system employing two frequencies of signalling current.

In the application to type (b), see Figs. 5, 6 and 12, the design of the values of the resistance network depends on whether or not the condenser for improving the dynamic responses is shunted across the common resistance, and also requires a common connection for the alternating voltage inputs. If the condenser is omitted then it is found that the same conditions as formerly applied still hold, the calculation of the circuit being based on the mean value of the rectified input from the unwanted source and the mean value of the rectified output on the common resistance from the wanted source for production of zero mean output on one of the output resistances. This zero mean output will of course be alternating in character but the subsequent filter arrangements will remove this. If the condenser is used, then the calculation of the direct current voltage on this condenser cannot be done on a simple Ohm's law basis, since this condenser together with the shunting common resistance now acts as the load in a rectifier circuit corresponding to the type (a) rectifier circuit. Using the terminology cited before, the input voltages E1 and E2 now consist of two alternating voltages having a common junction with themselves and the resistance $r1$, and the free ends are connected respectively to the free ends of the output resistances R1 and R2 via rectifiers, the sense of the latter being such as to pass current through $r1$ in the same direction from the two inputs; the junction of R1 and R2 being connected of course, to the free end of $r1$. If the latter be shunted by a condenser such that the voltage thereon is sensibly constant, then it will be seen that the condenser can be regarded as a storage condenser for both inputs, and the output resistances R1 and R2 as the respective internal resistances of the inputs. On this basis the voltages in the circuit can be calculated in the well known manner whereby the energy from the inputs sustaining the voltage on the condenser is contributed from the flow of currents from the inputs when the voltages of the latter exceed the sensibly constant direct current voltage of the condenser. In particular the condition for zero output on R1 or R2 will be obtained when the condenser voltage is just equal to the peak input voltage from the alternating voltages E2 or E1 respectively. The ratio for the resistances $r1$, R1 and R2 will then be different from the Ohm's law case previously cited. Apart from this, however, the principles of the invention are similar, and can be applied to any number of inputs in a similar manner.

Fig. 12 shows the application of the selective electrical circuit illustrated in Fig. 5 to A. C. signalling.

F1 and F2 represent sources of alternating current of two different frequencies either or both of which may be applied to a transmission line TL for the purposes of sending signals thereover. At the receiving end of the transmission line tuned circuits K1, L1 and K2, L2 are provided, one tuned to the frequency of currents generated by F1 and the other to the frequency of currents generated by F2. It will be clear that inevitably part of the current of one frequency will flow through the tuned circuit designed for the other frequency and that this will increase the closer the frequencies are to each other and the greater the effective resistance of the tuned circuits.

The invention serves, as will be clear from the foregoing description to prevent either frequency having any effect in the output circuit of the other. The output circuits in this case include resistance-condenser filters R3, C3 and R4, C4 for passing the D. C. component of the voltages V1 and V2 derived from the selective circuits to the grids of the valves VA3 and VA4. Relays RL1 and RL2 in the anode circuits of valves VA3 and VA4 respectively are thus controlled by the D. C. component of the voltages V1 and V2. B is the anode battery and B1 and B2 are bias batteries to provide initially low anode current.

The application of the type (c) rectifier circuit (see Figs. 7 and 8) is very similar to that used in type (b) in that the alternating inputs have a common junction and the inductive loads have another common junction, the two being joined by a resistance whose function is similar to that of $r1$. In this case since the respective currents through the inductive loads will be smoothed and they also pass through the common resistance, then the voltage across the latter will be substantially steady and the conditions for calculation of zero output in one of the loads are analogous to those used for type (b). Use can still be made of a condenser shunted across the common resistance for improvement of the dynamic responses, but as the voltage is steady this modification will not alter the calculated form of the circuit.

Figures 7, 8:
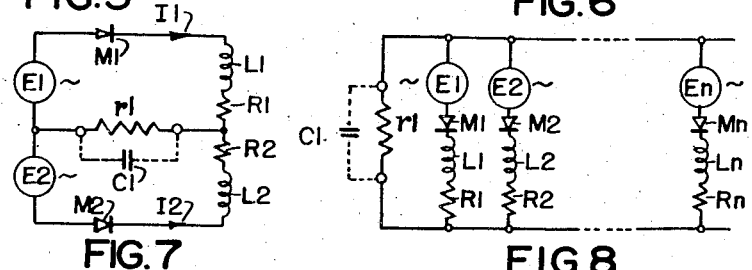
Figs. 7 and 8 illustrate applications of the invention to output circuits consisting of inductive receiving equipment such as electromagnetic relays.

The type (c) circuits are shown in Figs. 7 and 8 for two or $n$ inputs respectively. This is a very common type where electro-mechanical relays are operated from A. C. the relays being represented by inductances L1, L2 and resistances R1 and R2. The circuit has the valuable property of automatically smoothing the relay currents I1 and I2.

In types (b) and (c) it will be seen that the supply rectifiers are in series with the output resistances and are naturally connected so that no reversal of output is possible. It therefore follows that with such types of input circuit the output remains zero for all ratios of input equal to and exceeding the desired calculated ratio, thus dispensing with the necessity for suitable connection of additional rectifiers to achieve this result.

Figure 9:
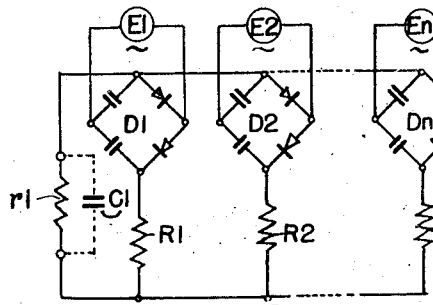
Figs. 9 and 10 illustrate applications of the invention in which voltage doubling and bridge type rectifier circuits are employed.
Figure 10:
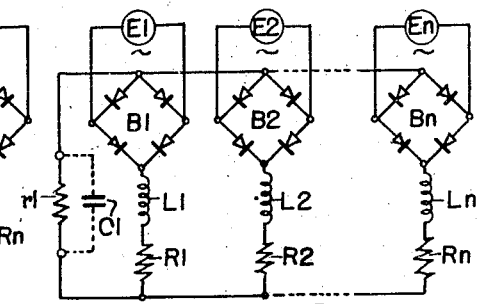

Figs. 9 and 10 show the application to voltage doubler and bridge type rectifier circuits. The first case is similar in treatment to the type (a) circuit since the condensers in the doubler networks D1, D2 to D$n$ act as storage condensers whilst the bridge networks B1, B2 to B$n$ are treated in similar manner to types (b) or (c) depending on the nature of the output loads.

There are many other combinations of rectifier circuits and loads to which the invention can be applied, and there is no reason why combinations of different types of circuits cannot be used provided each is treated on its own merits.

All types of rectification circuits can be used in the invention, such as half wave, full wave of the centre tapped input or bridge type, or voltage doubler, the only proviso being that one end of the rectified outputs whether smoothed or not shall have a common connection. In the case of bridge and voltage doubler rectifier circuits this means that the alternating inputs will not have common connection, but the application of the invention to such circuits should be apparent to those skilled in the art.

An explanation of the method of calculation used for rectifier types (b) and (c) will now be given.

Taking type (b) with the condenser C1 connected across r1 such that the voltage thereon is substantially smoothed, it is obvious that we have two sources for charging C1 having interval resistances R1 and R2 respectively. The fact that the voltages on R1 and R2 also serve as the respective outputs does not alter this conception.

Considering each of these circuits in turn it is seen that the charge on C1 is sustained by the energies flowing into it whenever M1 or M2 becomes conducting, that is, over the "top caps" of the respective input conducting waves. The treatment for arriving at the voltage on C1 by considering the energy in these top caps and equating it to the energy in the resistance r1 is well-known, for instance E. B. Moulin in the Journal of the Institution of Electrical Engineers, volume 80, page 553, gives a proof for at least one circuit and hence by extension to any number of circuits, and in the application to the present case one merely has to summate the top cap energies from all effective sources. For determining the ratio of the resistance network so that complete suppression of all partial input responses is obtained the problem is much simplified since we then have only the desired source in a conducting state and the well-known treatment suffices.

The calculations for the type (c) circuit are of similar nature to those for type (b) with the condenser in that the inductances act as smoothing devices for the current and conduction from the sources will only take place over the top caps of the input waves. It should be noted that the function of the inductance is to tend to maintain the D. C. circuit current, i. e., I1 or I2, over the periods when no energy is being taken from the inputs. This means that the rectifiers will be conducting over these periods. Hence current will be taken from the alternating sources but will not pass through the loads until its value equals that of the load current. If there is no source resistance external to the D. C. load current path (as is shown in Fig. 7) then the current taken from the alternating source rises immediately to the load value as soon as the alternating voltage becomes of value other than zero; in this case therefore conduction takes place over the whole of the input waveform and the load current is the mean value of the rectified voltage waveform divided by the load resistance. Thus it is now apparent how to design the value of the resistance r1 for suppression of one output for a given ratio of inputs.

If there is a source resistance external to the D. C. load current path, then the load current will obviously be reduced and can be calculated in a similar manner as for the equivalent rectifier circuit using a storage condenser (type (b) circuit). Conduction will now only take place over the top cap of the input and the calculations are directly analogous. For instance, knowing the values of R1 and the source resistance, the value of r1 can be calculated such that the voltage thereon due to the load current derived solely from E1 shall be equal to the peak value of E2 for the given ratio E1:E2, thus giving zero output from E2.

It is assumed that each input has a predominating response to a certain range of the common variable, for example, frequency, but that this degree of selection is not sufficient to prevent a significant response to other values of the variable thus involving marginal operation over the desired range.

A typical example is the selection of two or more frequencies by means of resonant circuits, where the operating range of each frequency may amount to ±3.3 per cent of the nominal (i. e. ±25 cycles on 750 cycles/sec.), and the adjacent unwanted frequency may be 0.8 of the wanted (i. e., 600 cycles/sec.). For Q values between 10 and 40 the worst ratio of wanted and unwanted responses over the range varies from about 3:1 to 4:1, so that little advantage is gained from use of high Q values, whilst such a ratio is not sufficient for correct operation without the use of marginal effects. Using the invention the unwanted response can be eliminated over the operating range by designing for zero output of the unwanted at the minimum ratio. For ratios of the order quoted such a design will involve little loss of wanted output (although this is of small importance, since the input can be increased as a whole) and in this particular instance since the minimum ratio changes so little with Q value, the design will be almost equally effective for all Q values. If the circuit includes rectifiers as described, the unwanted response will remain zero throughout the range, since it has been designed to cope with the minimum ratio within the range.

The invention is very simple to apply and has given the expected results with all forms of the circuits described, using the methods of calculation outlined. The improvement in both static and dynamic responses was found extremely satisfactory.

Conveniently the impedance or resistance r1 between the junction points may be made adjustable to permit of the conditions under which an output is rendered non-responsive to be varied to suit circumstances. Similarly other components of the circuits may be made adjustable so as to allow for commercial variations and to obtain the conditions of obtaining zero output for a given ratio between E1 and E2.

I claim:

1. In a selective signalling system, a plurality of input circuits upon each of which direct current signals of varying strength are impressed, a plurality of output circuits corresponding respectively to said input circuits, each of said output circuits having a certain resistance, a connection from each input circuit to its respective output circuit, whereby the signals impressed upon each input circuit normally are fed to its associated output circuit, responding means individual to each output circuit operated by the signals arriving at that output whenever such signals exceed a predetermined strength, a common resistance element included in all of said connections, said circuits so connected to said common resistance element and the resistance of said output circuits and said resistance element being so related to each other in value that if the ratio of the strength of direct current signals impressed simultaneously upon any two of said input circuits exceeds a predetermined amount a particular one of said signals will not be fed to the output circuit associated with the input circuit upon which that signal is impressed.

2. In a selective signalling system as claimed in claim 1, a line traversed by alternating currents, and a separate channel connecting each of said input circuits to said line, all of said channels including rectifying means and the different ones of said channels having different impedance characteristics whereby different direct current signals reach the different ones of said input circuits simultaneously from said line.

3. In a selective signalling system, a plurality of input circuits upon each of which a varying direct current voltage is impressed, a plurality of output circuits corresponding respectively to said input circuits, each of said output circuits having a certain resistance, a connection from each input circuit to its respective output circuit for causing the voltage impressed upon that input circuit to manifest itself at the associated output circuit, a common resistor included in all of said connections, the voltages impressed upon said inputs being so poled with respect to said resistor and the resistance of said output circuits and said resistor being such that a voltage impressed upon one of said inputs will manifest itself at the associated output only if it is not exceeded by a predetermined larger voltage impressed simultaneously upon another one of said input circuits, and means individual to each output circuit, operated at times responsive to the voltage manifest at said output circuit.

4. In a selective signalling system as claimed in claim 3, a common source of voltage, and different channels connecting the different ones of said inputs to said source, each of said channels having a different impedance whereby different voltages are impressed upon the different ones of said input circuits simultaneously from said common source.

5. In a selective signalling system, a plurality of input circuits upon each of which electrical signals of varying strength are impressed, a plurality of output circuits corresponding respectively to said input circuits, each of said output circuits having a certain impedance, a connection from each input circuit to its respective output circuit, whereby the signals impressed upon each input circuit normally are fed to its associated output circuit, a common impedance element included in all of said connections in such a way that a signal impressed upon any one of said input circuits will not be fed to its associated output circuit if, at the same time, a signal of predetermined strength is impressed upon another one of said input circuits, and responding means individual to each output circuit operated by signals arriving at that output circuit whenever such signals exceed a predetermined strength.

6. In a selective signalling system as claimed in claim 5, a common source of signals, and means including a plurality of channels corresponding respectively to said input circuits for deriving signals from said source and impressing them upon said input circuits.

7. In a selective signalling system, a plurality of input circuits upon each of which electrical signals of varying strength are impressed, a plurality of output circuits corresponding respectively to said input circuits, each of said output circuits having a certain impedance, a connection from each input circuit to its respective output circuit, whereby the signals impressed upon each input circuit normally are fed to its associated output circuit, a common impedance element so included in all of said connections that it tends to be energized in the same direction by all of said impressed signals, the impedance of said output circuits and said element being so proportioned with respect to one another in value that a signal impressed upon any one of said inputs will not be fed to its associated output if, at the same time, a signal of proportionately greater strength is impressed upon another one of said input circuits, and responding means individual to each output circuit operated by the signal fed to that output circuit if said signal exceeds a predetermined strength.

8. In a selective signalling system, a plurality of input circuits upon each of which electrical signals of varying strength are impressed, a plurality of output circuits corresponding respectively to said input circuits, each of said output circuits having a certain impedance, a connection from each input circuit to its respective output circuit, whereby the signals impressed upon each input circuit normally are fed to its associated output circuit, a common impedance element included in all of said connections, said circuit being so connected to said common element and the impedance of said output circuits and said element being so related to each other in value that if the ratio of the strength of signals impressed simultaneously upon any two of said input circuits exceeds a predetermined amount a particular one of said signals will be fed to the output circuit associated with the input circuit upon which that signal is impressed, and responding means individual to each output circuit operated by signals arriving at that output circuit whenever such signals exceed a predetermined strength.

9. In a selective signalling system, a line traversed by alternating current, a plurality of input circuits, different channels connecting the different ones of said circuits to said line, each of said channels having a different impedance characteristic whereby different signals reach different ones of said input circuits simultaneously from said line, a plurality of output circuits corresponding respectively to said input circuits, each of said output circuits having a certain impedance, a connection from each input circuit to its respective output circuit, whereby the signals impressed upon each input circuit normally are fed to its associated output circuit, a common impedance element so included in all of said connections that if the ratio of the strength of signals impressed simultaneously upon any two of said input circuits exceeds a predetermined amount a particular one of said signals will not be fed to the output circuit associated with the input circuit upon which that signal is impressed, and responding means individual to each output circuit operated by the signal fed to that output circuit if said signal exceeds a predetermined strength.

10. A selective signalling system as claimed in claim 9, wherein alternating currents of different frequencies traverse said line, and wherein the different ones of said channels include band pass filters tuned to different frequency bands.

11. In a selective signalling system, a source of light, a plurality of photo-electric cells activated simultaneously by said source, each of said cells having a different color response, a plurality of input circuits corresponding respectively to said cells, means for impressing the output of each cell upon its respective input circuit, a plurality of output circuits corresponding respectively to said input circuits, means whereby each input circuit, upon energization, normally causes its respective output circuit to be energized, and means including a common resistance element connected between said output and input circuits for preventing each input circuit from causing its respective output circuit to be energized if, at the time said input circuit is energized, any other input circuit is energized to a predetermined extent.

12. In a selective signalling system, a plurality of photo-electric cells each having a different color or response characteristic, a common source of light activating said cells simultaneously, a different circuit for each cell normally energized in accordance with the output of that cell, and means including a resistance element common to said circuits controlled by the ratio of the outputs of said cells for preventing the energization of any of said circuits whenever the ratio of the output of the cell associated with that circuit to the output of another cell falls below a predetermined value.

13. In a selective signalling system, a source of light, a plurality of photo-electric cells activated simultaneously by said source, each of said cells having a different color response characteristic, a plurality of channels corresponding respectively to said cells, each channel having an input and an output, means for impressing the output of each cell upon the input of its associated channel, whereby signals from each cell tend normally to be fed to the output of the channel associated with that cell, the output of each channel having a predetermined impedance, a common impedance element included in all of said channels, the impedance of said outputs and of said element being such that a signal impressed by a cell upon its associated channel input will not be fed to the associated output if, at the same time, a signal of predetermined strength is impressed upon another one of said inputs by its associated cell, and means individual to each channel's output responsive to the signals arriving at that output.

14. In a signalling system, two signal channels each having an input and an output, means for impressing upon each input a signal varying in strength, means whereby the strength of the resultant signal appearing at the output of each channel tends to vary in direct proportion to the strength of the signal impressed upon the input of that channel and also tends to vary in inverse proportion to the strength of the signal impressed upon the input of the other channel, and responding means individual to each channel operated by the signal appearing at the output of that channel whenever the strength of such signal exceeds a predetermined value.

15. In a signalling system, a plurality of signal channels each having an input upon which a varying voltage is impressed, an output for each channel, common means included in all of said channels producing in each channel a bias voltage always opposing the voltage impressed upon that channel's input thereby to reduce the voltage appearing at the output of such channel, means whereby the magnitude of said bias voltage is determined conjointly by the voltages impressed upon all of said inputs, and responding means individual to each channel operated by the voltage appearing at the output of that channel whenever such voltage exceeds a predetermined value.

16. In a signalling system, a pair of signal channels each having an input upon which a varying voltage is impressed, an output for each channel, means producing in each channel a bias voltage always opposing the voltage impressed upon that channel's input thereby to reduce the voltage appearing at the output of such channel, and means whereby the magnitude of said bias voltage in each channel is so controlled by the voltages impressed upon both of said inputs that it will equal the voltage impressed upon one input whenever the voltages impressed upon both inputs are in a predetermined ratio to each other.

17. In a selective signalling system, a plurality of signal channels, means for impressing signals of variable strength upon all of said channels concurrently, common means included in all of said channels for attenuating the respective signals in all channels by the same amount, means whereby the amount of such attenuation is determined conjointly by the strength of the signals impressed upon all of said channels, and responding means individual to each channel operated by the attenuated signal in that channel if such attenuated signal exceeds a predetermined strength.

18. In a selective signalling system, a plurality of signal channels, means for impressing signals of variable strength upon all of said channels concurrently, common means included in all of said channels for attenuating the respective signals in all channels by the same amount, means whereby an increase in the strength of the signal impressed upon any one of said channels always increases the amount of such attenuation and a decrease in the strength of the signal impressed upon any one of said channels always decreases the amount of such attenuation, and responding means individual to each channel operated by the attenuated signal in that channel if such attenuated signal exceeds a predetermined strength.

19. In a selective signalling system, a common resistor, a plurality of circuits each connected in bridge of said common resistor, each of said circuits including, in series, a resistor individual to that circuit and a source of direct current potential of variable magnitude, said sources being so poled in their respective circuits that all sources tend to cause current to flow in the same direction in said common resistor, and means individual to each of said individual resistors operated by the voltage drop in that individual resistor whenever such voltage drop exceeds a predetermined value.

20. In a selective signalling system, a common resistor, a plurality of circuits each connected in bridge of said resistor, each of said circuits including an individual resistor, means for impressing a potential upon any one of said circuits thereby to cause current to flow in said common resistor and the individual resistor in said one circuit, a plurality of devices corresponding respectively to the different individual resistors, each device operated by the voltage drop in its corresponding resistor whenever such voltage drop exceeds a predetermined value, and means sometimes effective while said potential is impressed upon said one circuit to impress upon another of said circuits a potential so related to said first potential as to increase the current flowing through said common resistor and consequently decrease the current flowing in said one circuit due to said first potential.

21. In a selective signalling system, a common resistance, a plurality of circuits each connected in bridge of said resistance, each of said circuits including an individual resistance, means for impressing a potential upon any one of said circuits thereby to cause current to flow in said common resistance and in the resistance individual to said one circuit, said current flow in said resistances effective to produce a voltage drop in each, a plurality of devices corresponding respectively to the different individual resistances, each device operated variably in accordance with the magnitude of the voltage drop in its corresponding individual resistance, and means sometimes effective while said potential is impressed upon said one circuit to impress a potential upon another one of said circuits, thereby to alter the voltage drop in said common resistance and consequently alter the voltage drop in the resistance individual to said one circuit.

BERTRAM MORTON HADFIELD.

REFERENCES CITED

The following references are of record in the file of this patent:

UNITED STATES PATENTS

| Number | Name | Date |
|---|---|---|
| 2,070,900 | Harris | Feb. 16, 1937 |
| 1,695,047 | Horton | Dec. 11, 1928 |
| 2,300,593 | Perroux | Nov. 3, 1942 |
| 2,262,457 | Hammond | Nov. 11, 1941 |
| 2,149,175 | Krugel | Feb. 28, 1939 |
| 2,209,158 | Goldsmith | July 23, 1940 |
| 2,276,669 | Pullis | Mar. 17, 1942 |
| 2,176,742 | La Pierre | Oct. 17, 1939 |
| 2,207,540 | Hansel | July 9, 1940 |